Feb. 3, 1953     D. I. PLETCHER     2,627,133
FISHING LINE AND LURE CLAMP FOR FISHING POLES
Filed Aug. 13, 1949
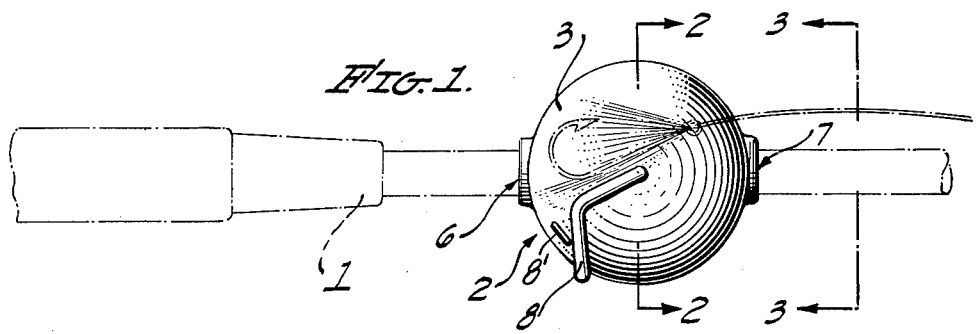
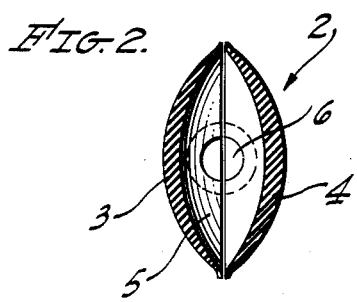 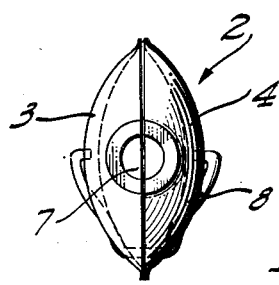
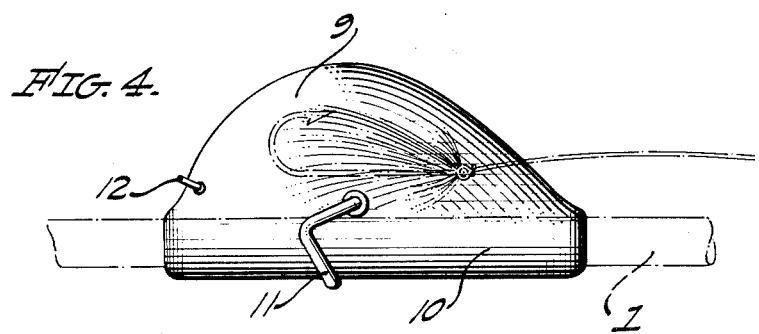
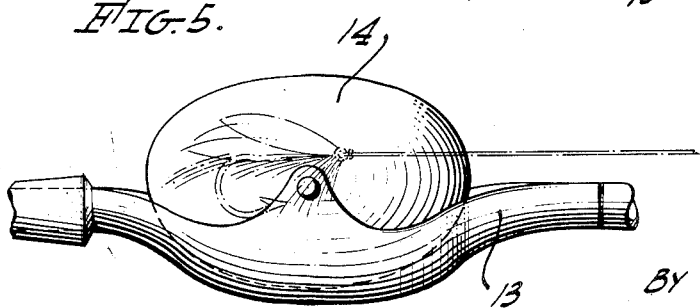
INVENTOR.
DELMER I. PLETCHER,
BY
ATTORNEY.

Patented Feb. 3, 1953

2,627,133

UNITED STATES PATENT OFFICE 2,627,133

FISHING LINE AND LURE CLAMP FOR FISHING POLES

Delmer I. Pletcher, Bakersfield, Calif.

Application August 13, 1949, Serial No. 110,199

6 Claims. (Cl. 43—25.2)

This invention relates to a fishing line and lure clamp, which is attached to a fishing pole for the purpose of holding the line or the lure so that it will not become entangled when the fisherman is moving through brush or trees.

An object of my invention is to provide a novel fishing line and lure clamp which clasps the pole within the two halves of the clamp, the pole being gripped by the spring action of the clamp itself or an included spring.

Another object of my invention is to provide a novel line and lure clamp of the character stated, which can be easily attached to various size poles or types of poles, without having to change the design or arrangement of the clamp itself.

A feature of my invention is to provide a novel line and lure clamp of the character stated, which is so shaped that its smooth contours will prevent any line entanglement.

Another feature of my invention is to provide a novel line and lure clamp which can be quickly and easily moved from a pole and re-attached thereto as desired.

Still another feature is to provide a novel clamp of the character stated, which is balanced on the pole and will not interfere with the proper throw or balance of the pole, thus preventing a line snag.

Another object of my invention is to provide a line and lure clamp, the halves of which are formed of a resilient material so that it will automatically close after pressure is exerted thereon to open the same and the halves of which are hollow so as to protect and hold the line or the hook.

Still another object is to provide a construction of the character stated, which is simple and the cost of which is relatively low.

Other objects, advantages and features of invention may appear from the accompanying drawing, the subjoined detailed description and the appended claims.

In the drawing—

Figure 1 is a side elevation of my fishing line and lure clamp.

Figure 2 is a sectional view taken on line 2—2 of Figure 1.

Figure 3 is an end view as taken on line 3—3 of Figure 1.

Figure 4 is a side elevation of a slightly modified form of line and lure clamp.

Figure 5 is a side elevation of still another modified form of line and lure clamp.

Referring more particularly to the drawing, the numeral 1 indicates the usual fishing rod and my clamp 2 grips this rod in the following manner:

The clamp 2 consists of two complementary halves 3—4, these halves being somewhat hollow or dish-shaped so that a cavity or opening 5 is provided therein. The halves 3—4 are preferably formed of a resilient material, such as rubber or plastic, and therefore have a natural tendency to spring together or hold the shape, substantially as shown in Figure 3. The meeting lips of the parts 3—4 are thus pressed tightly together for the purpose of gripping the line or the lure, as will be further described.

A pair of diametrically opposed recesses 6—7 may be provided in the halves 3—4, so that the pole 1 can pass therethrough. This provides a simple means of guiding the pole 1 to its proper position in the clamp, however, if desired these recesses 6—7 may be eliminated since the pressure of the lips of the halves 3—4 around the pole 1 will effectively hold the clamp in position.

A substantially U-shaped spring 8 presses against the halves 3—4 and preferably at the center so as to urge these halves together around the pole and also to assist in gripping the line or the lure. The spring 8 may be external, as shown, or it may be imbedded within the rubber or plastic of the halves 3—4. Under some conditions, the spring 8 may be eliminated entirely, and the spring of the halves 3—4 would be sufficient to hold the clamp in position on the fishing pole. A metal ring 8' extends through both halves 3—4, to hold the bottom portions of these halves together when the upper parts thereof are spread apart.

It will be noted that the type shown in Figures 1 to 3, both inclusive, is substantially circular and thus projects on both sides of the pole 1, as shown in Figure 1. To spring the halves 3—4 apart, it is only necessary to squeeze the halves at diametrically opposed points, this will cause the halves 3—4 to gap apart, permitting the fly lure or line to be dropped into the space 5, and when the clamp is released the meeting lips thereof will press together, thus gripping the line and holding the lure within the cavity or opening 5.

The modification shown in Figure 4 varies in shape in that the halves of the clamp are in the form of a clam, that is, the halves 9—9 have a pole receiving portion 10 at the bottom which grips the pole 1. The remaining portion of the halves project above or below the pole. A spring 11 again presses the halves of the clamp together in the same manner as previously described. A ring 12 at the rear of the clamp holds the two halves together at this point, thus when pressure is applied to the edges of the clamp it will spread apart along the forward edges and not at the rear.

In Figure 5 I have still another modification, including a fishing pole section 13, which is split or bifurcated so as to hold the clamp 14 between the bifurcations. The clamp 14 may be of the type shown in Figure 1 or 4, and is formed in halves, as previously described, the pole section 13 being formed of spring material so as to press the halves of the clamp together in the same manner as previously described. The line or lure is held between the halves of the clamp in the same manner as previously described.

Having described my invention, I claim:

1. A fishing line and lure clamp for fishing poles comprising a pair of complementary hollow half sections, the concave faces of both of the sections facing each other and adjacent edges having recesses to receive a fishing pole therebetween, spring means engaging and pressing both of the sections together to grip the fishing pole and line, both of said half sections being formed of deformable non-metallic material.

2. A fishing line and lure clamp for fishing poles comprising a pair of complementary hollow half sections, the concave faces of both of the sections facing each other to receive a fishing pole therebetween, a spring engaging and pressing both of the sections together to grip the fishing pole and line, both of said half sections being formed of deformable non-metallic material.

3. A fishing line and lure clamp for fishing poles comprising a pair of complementary hollow half sections formed of resilient non-metallic material, the concave faces of both of the sections facing each other to receive a fishing pole therebetween, both of said sections being concave in form, each of the adjacent edges of said sections having an arcuate opening therein through which the pole extends, and means pressing said half sections together to grip the pole and line.

4. A fishing line and lure clamp for fishing poles comprising a pair of complementary hollow half sections formed of resilient non-metallic material, the concave faces of both of the sections facing each other to receive a fishing pole therebetween, both of said sections being concave in form, each of the adjacent edges of said sections having an arcuate opening therein through which the pole extends, and means pressing said half sections together to grip the pole and line, said means including a spring engaging both of said half sections.

5. A fishing line and lure clamp for fishing poles comprising a pair of complementary hollow segments engaging each other on their outer edges, the concave faces of both of said segments facing each other to receive a fishing pole therebetween, spring means engaging and pressing said segments together to engage and grip both the fishing pole and the line, said segments being formed of a deformable non-metallic material.

6. A fishing line and lure clamp for fishing poles comprising a pair of complementary hollow segments engaging each other, the concave faces of both of the sections facing each other to receive a fishing pole therebetween, a substantially U-shaped spring engaging both of said segments on the outside thereof and pressing said segments together, said spring being pivotally attached to both of said segments, said spring pressing the segments together to engage and grip the fishing pole and the line, said segments being formed of a deformable non-metallic material.

DELMER I. PLETCHER.

REFERENCES CITED

The following references are of record in the file of this patent:

UNITED STATES PATENTS

| Number | Name | Date |
|---|---|---|
| 573,572 | Dales | Dec. 22, 1896 |
| 676,724 | McCargar et al. | June 18, 1901 |
| 2,285,888 | Benton | June 9, 1942 |
| 2,487,344 | Lambert | Nov. 8, 1949 |
| 2,523,361 | Farnham | Sept. 26, 1950 |